(12) United States Patent
Popp et al.

(10) Patent No.: US 7,670,257 B2
(45) Date of Patent: Mar. 2, 2010

(54) METHOD FOR OPERATING A DRIVE TRAIN

(75) Inventors: Christian Popp, Kressbronn (DE);
Bernd Allgaier, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 326 days.

(21) Appl. No.: 11/774,189

(22) Filed: Jul. 6, 2007

(65) Prior Publication Data

US 2008/0064561 A1 Mar. 13, 2008

(30) Foreign Application Priority Data

Jul. 8, 2006 (DE) .................. 10 2006 031 684

(51) Int. Cl.
*B60W 10/02* (2006.01)
*B60W 10/04* (2006.01)

(52) U.S. Cl. .................. 477/6; 477/8; 477/174; 903/946

(58) Field of Classification Search .......... 477/5, 477/6, 8, 174, 180; 903/946
See application file for complete search history.

(56) References Cited

U.S. PATENT DOCUMENTS 6,077,186 A * 6/2000 Kojima et al. ............. 477/3
2005/0221947 A1 10/2005 Mesiti et al.
2006/0089232 A1 4/2006 Kobayashi et al.
2006/0266568 A1 11/2006 Barske
2007/0114082 A1 * 5/2007 Nozaki et al. ............. 180/65.6
2008/0132379 A1 * 6/2008 Matsubara et al. ............. 477/3

FOREIGN PATENT DOCUMENTS

| DE | 103 53 256 B3 | 3/2005 |
| DE | 10 2004 023 673 A1 | 12/2005 |
| EP | 1 762 417 A1 | 3/2007 |
| GB | 2 413 998 A | 11/2005 |

* cited by examiner

*Primary Examiner*—Tisha D Lewis
(74) *Attorney, Agent, or Firm*—Davis & Bujold, P.L.L.C.

(57) ABSTRACT

A method of operating a motor vehicle drive train having a hybrid drive including an internal combustion engine, an electric motor and an automatic transmission. A clutch is located between the internal combustion engine and the electric motor, and a clutch or a torque converter is located between the electric motor and the automatic transmission such that, when the drive train is powered exclusively by the electric motor, the internal combustion engine can be started by engagement of the clutch located between the internal combustion engine and the electric motor. The clutch, arranged between the internal combustion engine and the electric motor, is engaged during the process of downshifting when the internal combustion engine is started.

15 Claims, 4 Drawing Sheets

METHOD FOR OPERATING A DRIVE TRAIN

This application claims priority from German patent application serial no. 10 2006 031 684.3 which was filed Jul. 8, 2006.

FIELD OF THE INVENTION

The invention relates to a method for operating a motor vehicle drive train comprising at least an automatic transmission and a hybrid drive.

BACKGROUND OF THE INVENTION

The main components of a drive train of a motor vehicle are an engine and a transmission. A transmission converts torque and rotational speeds into the driving force of the engine. The present invention relates to a method for operating a drive train that comprises at least an automatic transmission and a hybrid drive for the power plant.

US 2005/0221947 A1 discloses a method for operating a motor vehicle drive train comprising at least an automatic transmission and a hybrid drive, where at one side a clutch is arranged between a combustion engine of the hybrid dive and an electric motor of the hybrid drive, while at the other side another clutch is arranged between the electric motor of the hybrid drive and the automatic transmission. When the drive train is driven exclusively by the electric motor of the hybrid drive, the internal combustion engine of the hybrid drive can be started, according to the prior art, by engaging the clutch arranged between the internal combustion engine and electric motor of the hybrid drive, while the automatic transmission of the drive train is upshifting. According to US 2005/0221947 A1, the electric motor of the hybrid drive starts the internal combustion engine of the hybrid drive, causing a change in rotational speed at the transmission output of the automatic transmission, which the driver usually perceives as a disturbance.

SUMMARY OF THE INVENTION

Starting from here, the object of the present invention is to provide a method for operating a drive train comprising an automatic transmission and a hybrid drive, where starting of the internal combustion engine is virtually undetectable.

According to the invention, the clutch arranged between the internal combustion engine and the electric motor is engaged during the process of downshifting when the internal combustion engine is started.

The present invention represents the first time that the option of starting the internal combustion engine of a hybrid drive train timing the process of downshifting has been proposed. While this can bring about a slightly longer shifting time for the downshift, virtually no chance in torque is detectable at the transmission output of the automatic transmission, such that starting the internal combustion engine is unnoticeable to the driver.

The clutch arranged between the internal combustion engine and electric motor of the hybrid drive is preferably engaged when the rotational speed is increased at the transmission input of the automatic transmission as a result of the downshift.

In an advantageous refinement of the invention, the internal combustion engine is started during a downshift in such a way that the internal combustion engine stops coasting no later than the completion of the downshift, whereupon it generates a positive drive torque. During the coasting of the internal combustion engine, a pressure is kept nearly constant at a shifting component of the automatic transmission to be engaged during the downshift, and/or at a shifting component of the automatic transmission to be opened during the upshift.

Starting of the internal combustion engine is preferably assisted by the increase in the electric motor torque appearing during the coasting of the internal combustion engine.

BRIEF DESCRIPTION OF THE DRAWINGS

Preferred embodiments of the invention are described in the following description. Examples of the invention are described with the aid of the drawings without being limited thereto. Shown in.

DETAILED DESCRIPTION OF THE PREFERRED EMBODIMENTS

Figure 1:
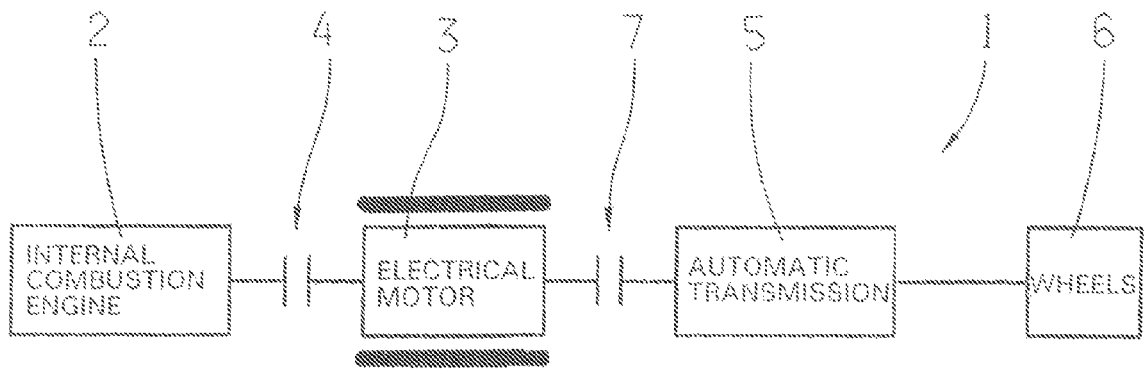
FIG. 1 is a first schematic diagram of drive train for a motor vehicle, in which the inventive method can be applied.
Figure 2:
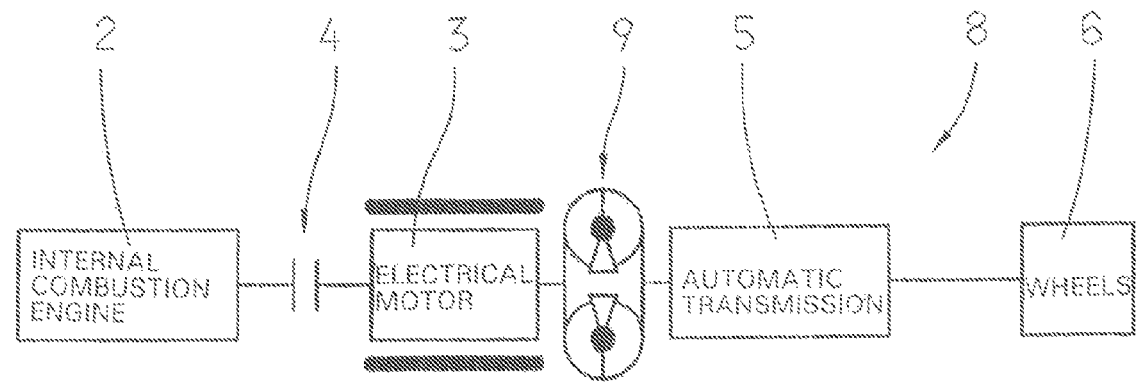
FIG. 2 is a second schematic diagram of a drive train for a motor vehicle in which the inventive method can be applied.

The present invention relates to a method for operating a motor vehicle drive train that comprises at least an automatic transmission and hybrid drive for drive unit. A hybrid drive comprises an internal combustion engine and an electric motor. FIGS. 1 and 2 show drive train diagrams for a motor vehicle in which the inventive method can be applied.

FIG. 1 snows a diagram of a drive train 1 of a motor vehicle, where the drive train 1 illustrated in FIG. 1, comprises a hybrid drive, which in turn comprises an internal combustion 2 engine and an electric motor 3. Connecting the internal combustion engine 2 and the electric motor 3, is a clutch 4, which is disengaged when the drive train 1 is powered exclusively by the electric motor 3. In addition to the hybrid drive, the drive train 1, illustrated in FIG. 1, comprises an automatic transmission 5 which redirects the driving force generated by the hybrid drive to the wheels 6 of the drive train to be powered. The automatic transmission 5 comprises multiple shifting components, which can be controlled for changing gears. According to FIG. 1 an additional clutch 7 is connected between the electric motor 3 of the hybrid drive and the automatic transmission 5

FIG. 2 is another diagram of a drive train 8 of a motor vehicle, where the drive train, as illustrated in FIG. 2, is distinguished from the drive train of FIG. 1 only by a torque converter 9 instead of a clutch, is connected between the electric motor 3 of the hybrid drive and the automatic transmission 5. Otherwise, the drive train diagram shown in FIG. 2 is identical to the drive train diagram shown in FIG. 1. To avoid unnecessary repetition, the same reference numbers are used for identical assemblies. Drive trains illustrated in FIGS. 1 and 2 are called parallel-hybrid-drive trains.

If a drive train, as illustrated in FIG. 1 or 2, is powered exclusively by the electric motor 3 of the hybrid drive when the clutch 4 is disengaged, it may be necessary under certain operating conditions to start the internal combustion engine 2 of the hybrid drive, this is accomplished by engaging the clutch 4 connecting the internal combustion engine 2 and the electric motor 3 of the hybrid drive.

Starting the internal combustion engine 2 so it is virtually undetectable by the driver, the invention proposes starting the internal combustion engine 2 by engaging the clutch 4 during the downshifting of the automatic transmission. A downshift is a gear change from a starting gear with a higher gear ratio to a target gear with a lower gear ratio.

Figure 3:
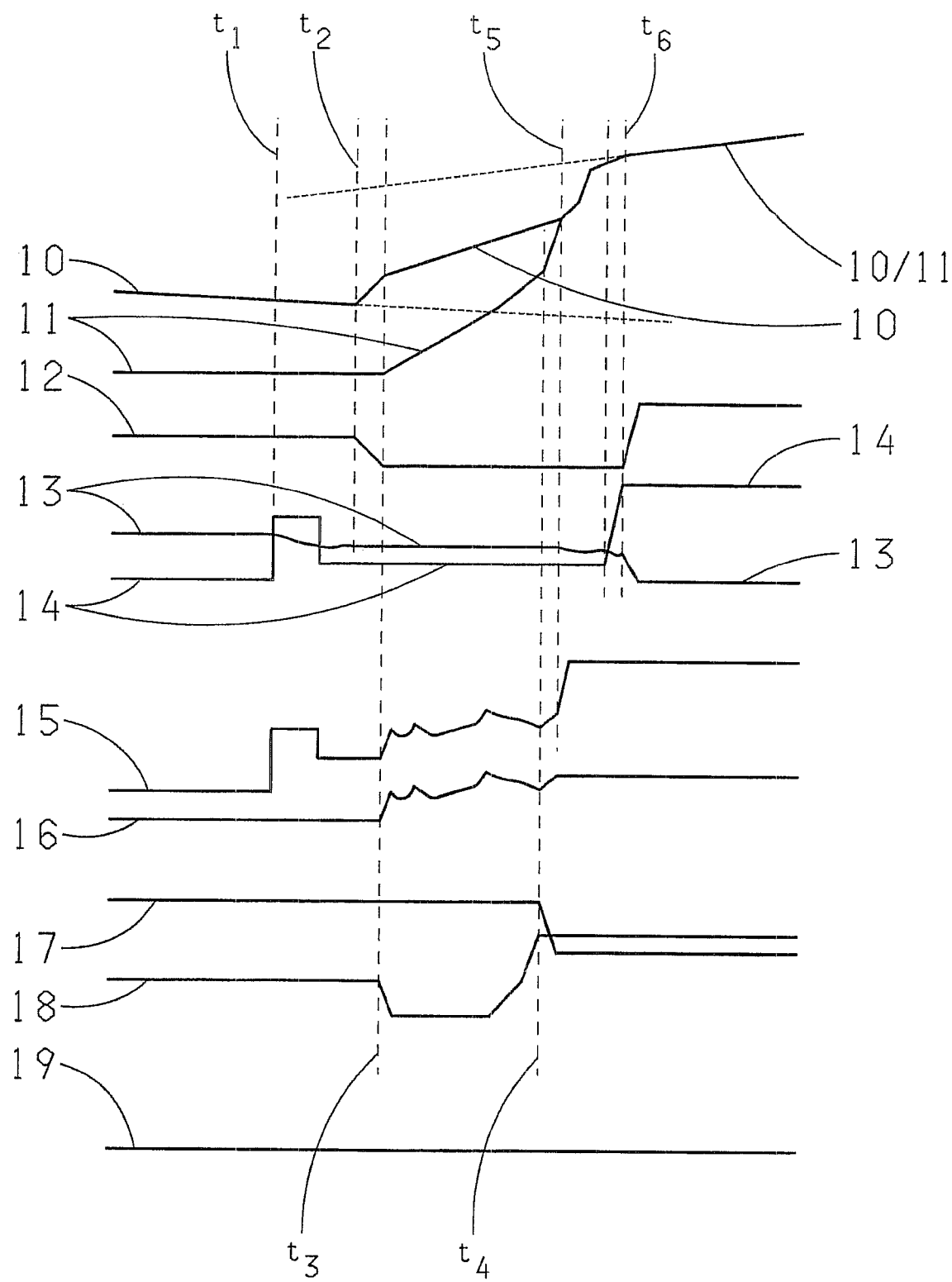
FIG. 3 is a first graph to illustrate the inventive method for operating a drive train of a motor vehicle.

FIG. 3 shows arising signal patterns over time in an embodiment of the inventive method, where a signal pattern over time 10 visually represents the behavior of a rotational speed of the transmission input of the automatic transmission 5, where a signal pattern over time 11 visually represents the behavior of an engine rotational speed, where a signal pattern over time 12 visually represents the behavior of torque at the transmission output of the automatic transmission 5, where a signal pattern over time 13 visually represents the behavior of the pressure or the behavior of the target pressure of a shifting component to be disengaged during downshifting and a signal pattern over time 14 visually represents the behavior of the pressure of a shifting component of the automatic transmission 5 to be engaged during downshifting, where a signal pattern over time 15 visually represents the pressure on the clutch 4 and a signal pattern over time 16 visually represents the torque on the clutch 4, and the signal pattern over time 17 visually represents the torque generated by the electric motor 3 of the hybrid drive, the signal pattern overtime 18 visually represents the torque generated by the internal combustion engine 2 of the hybrid drive and the signal pattern over time 19 visually represents the accelerator pedal position.

As FIG. 3 illustrates, the shifting component to be opened or engaged during downshifting is prepared for shifting by a charging phase during a downshifting-triggering event at a point in time $t_1$, as signal pattern over time 14 illustrates, at this point in time $t_1$ the clutch 4 arranged between the internal combustion engine 2 and the electric motor 3 of the hybrid drive is also prepared for engagement by a charging phase as signal pattern 15 illustrates.

At the point in time $t_1$, the shifting component of the automatic transmission to be engaged or opened during downshifting also enters to a shifting phase as signal pattern 13 illustrates, while at point in time $t_2$ the pressure on the shifting component to be disengaged during downshifting is decreased until the rotational speed of the transmission input of the automatic transmission 5 separates from the synchronous rotational speed of the start of the downshift, as signal pattern 10 illustrates, and a positive rotational speed progression gradient is subsequently present at the transmission input.

As FIG. 3 illustrates, the clutch 4 is transferred at point in time $t_3$ from the charging phase to the shifting phase, so that at point in time $t_3$, the infernal combustion engine 2 is coupled to the electric motor 3 through the engaging of the clutch 4. Beginning at point in time $t_3$, the internal combustion engine is started from a standstill and accelerated to the rotational speed of the transmission input of the automatic transmission, while a leveling of the gradients of the rotational speed behavior on the transmission input of the automatic transmission 5 appears, as signal pattern 10 illustrates. Beginning at point in time $t_3$, the internal combustion engine 2 must be coasting in order to start. While coasting, the internal combustion engine 2 generates a negative drive torque.

Coasting of the internal combustion engine does not end until the point in time $t_4$, whereupon reaching the point in time $t_4$, the internal combustion engine generates a positive drive torque. At the point in time $t_5$, the rotational speed of the internal combustion engine 2 has reached the rotational speed of the transmission input of the automatic transmission 5, while at point in time $t_6$ the downshift is completed, whereupon the rotational speed of the transmission input of the automatic transmission 5 and the rotational speed of the internal combustion engine 2 are the same as the synchronous rotational speed of the target gear of the downshift being executed.

According to the signal patterns over time, illustrated in FIG. 3, the clutch 4 located between the internal combustion engine 2 and electric motor 3 of the hybrid drive is then engaged to start the internal combustion engine, when rotational speed of the transmission input of the automatic transmission 5 is increased following the downshift.

The internal combustion engine 2 generates a positive drive torque before the completion of the downshift, namely, before the input rotational speed of the automatic transmission 5 corresponds to the synchronous rotational speed of the target gear of the downshift. The internal combustion engine 2 preferably generates a positive drive torque already, at the point in time at which the rotational speed of the internal combustion engine equals the input rotational speed of the automatic transmission 5.

As FIG. 3 also demonstrates, the internal combustion engine is started during a downshift in such a way that while the internal combustion engine is coasting, in a time span defined by points in time $t_3$ and $t_4$, both the pressure represented by the signal pattern 13 on the automatic transmission 5 shifting component to be disengaged during the downshift and the pressure represented by signal pattern 14 on the automatic transmission 5 shifting component to be engaged during the downshift are kept nearly constant. As signal pattern 15 illustrates, the pressure on the clutch 4 located between the internal combustion engine 2 and the electric motor 3 increases during this time span. As signal pattern 17 illustrates, the torque generated by the electric meter 3 remains unchanged during this time span in the embodiment illustrated in FIG. 3.

Figure 4:
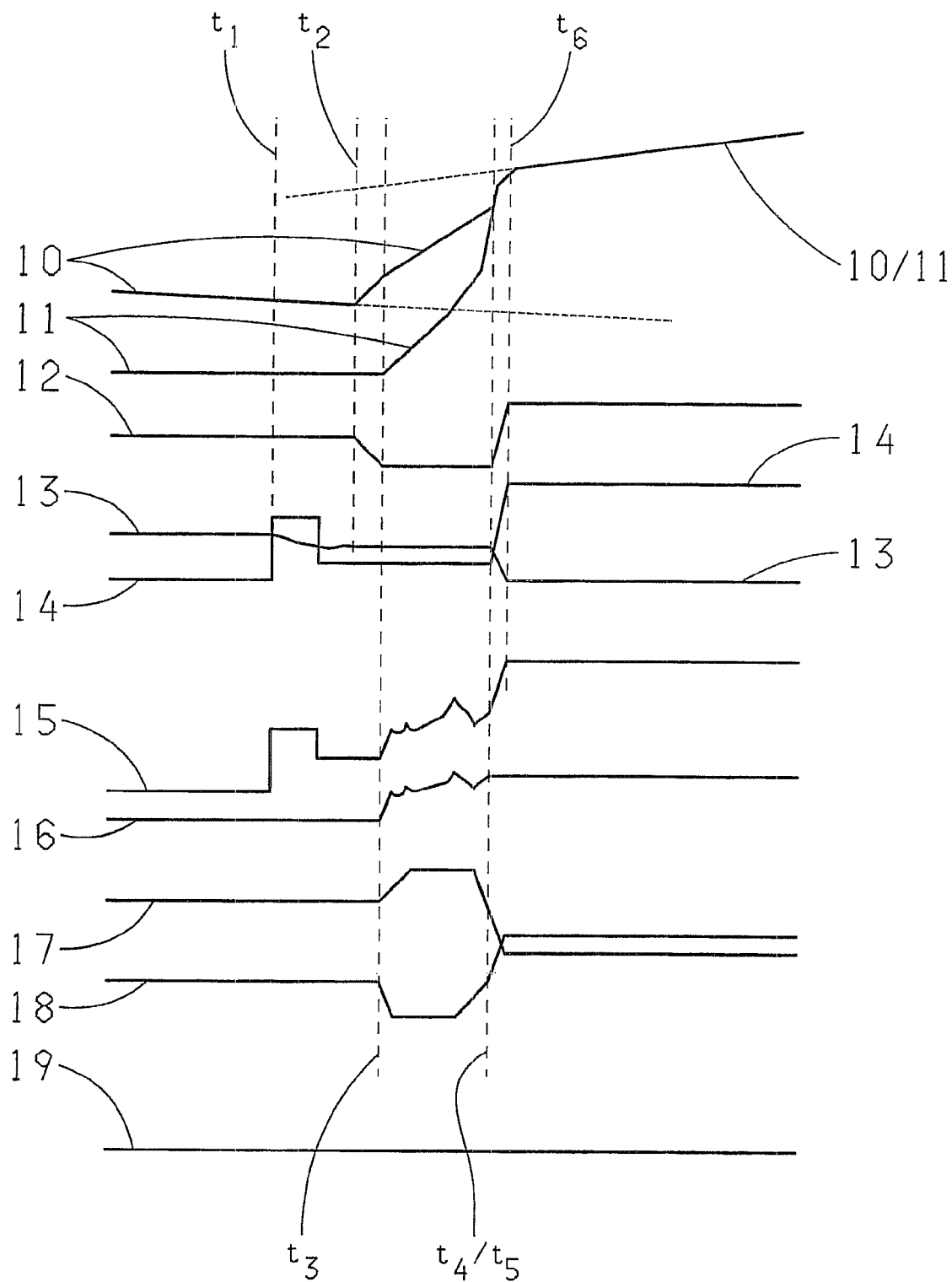
FIG. 4 is a second graph to illustrate the inventive method for operating a drive train of a motor vehicle and FIG. 5 is a third graph to illustrate the inventive method for operating a drive train of a motor vehicle.

According to FIG. 4, torque of the electric motor 3 of the hybrid drive can be increased to assist the start of the internal combustion engine 2 while the engine is being coasted, as signal pattern 17 represents, whereupon the points in time $t_4$ and $t_5$ coincide, as signal pattern 4 illustrates. In the embodiment illustrated in FIG. 4, the internal combustion engine generates a positive torque exactly at the point in time at which the rotational speed of the internal combustion engine 2 reaches the present rotational speed of the transmission input of the automatic transmission 5, as the signal patterns 10 and 11 illustrate. As a result, the process of downshifting is accelerated, whereby, however, the electric motor 3 can be driven in an overload range briefly.

Figure 5:
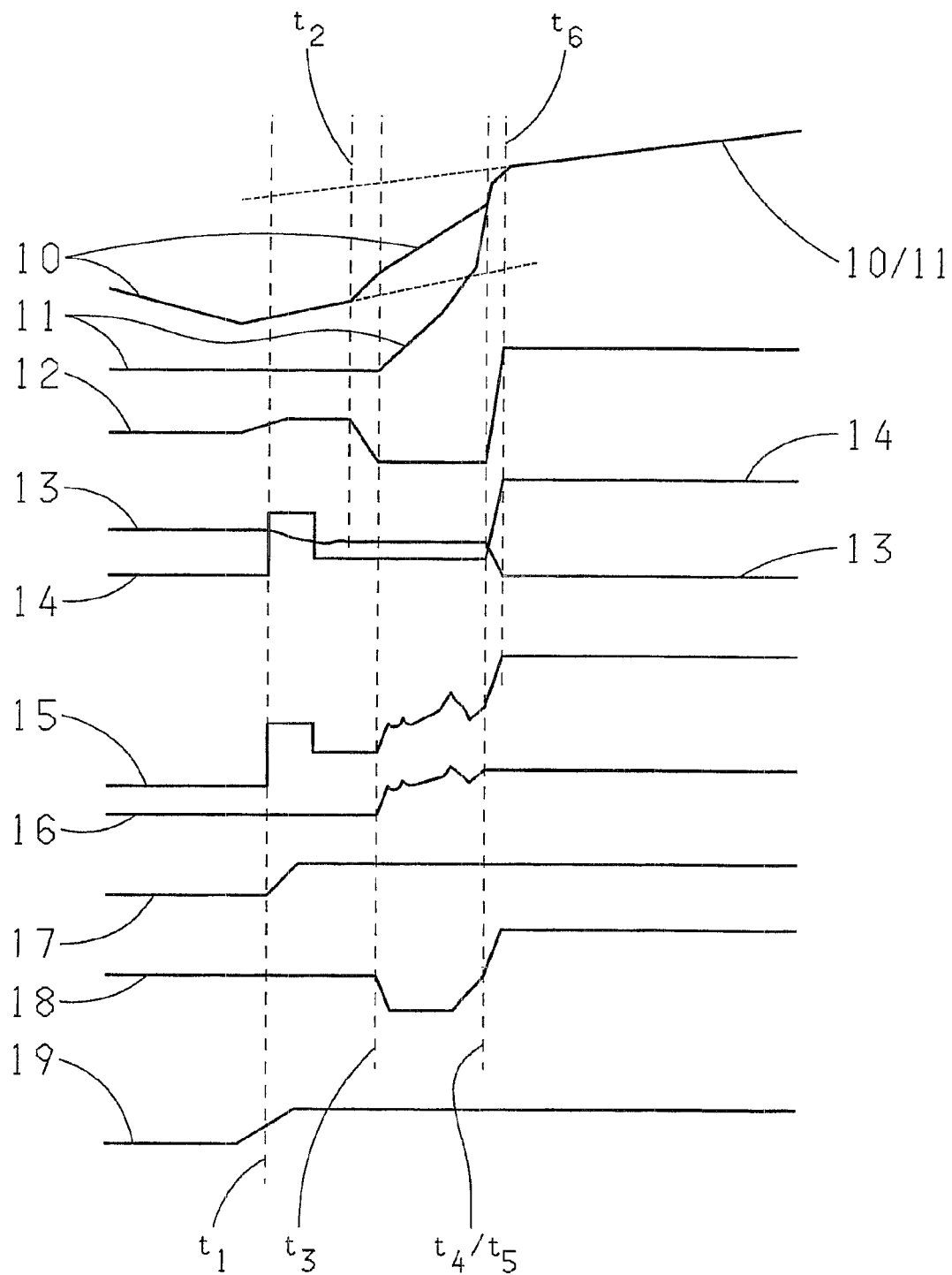

In the embodiments illustrated in FIGS. 3 and 4, the signal patterns 19 show that the accelerator position is constant such that downshifting cannot be initiated through the influence of the accelerator pedal, but instead, for example, by the battery charge being too low to maintain the desired speed. As FIG. 5 shows, shifting can be triggered by the driver manipulating the accelerator pedal according to the signal pattern 19 illustrated there, whereupon the torque of the electric motor 3 of the hybrid drive increases at point in time $t_1$ as signal pattern 17 illustrates.

According to the present invention, the internal combustion engine of a hybrid drive is started during a downshift of the automatic transmission, namely when an increase in torque of the transmission input of the automatic transmission arises during the downshifting. By engaging the clutch 4 positioned between the internal combustion engine 2 and the electric motor, it is possible to increase the time needed for executing a downshift by a minimal amount, because, although the drive torque is determined by a slipping shifting component of the automatic transmission during the downshift, this does not affect the acceleration of the motor vehicle during the downshift. The engaging of the internal combustion engine is therefore virtually undetectable to a driver.

REFERENCE NUMBERS

1 Drive train
2 Internal combustion engine
3 Electric motor
4 Clutch
5 Automatic transmission
6 Wheel
7 Clutch
8 Drive train
9 Torque Converter
10 Signal pattern
11 Signal pattern
12 Signal pattern
13 Signal pattern
14 Signal pattern
15 Signal pattern
16 Signal pattern
17 Signal pattern
18 Signal pattern
19 Signal pattern

The invention claimed is:

1. A method of operating a motor vehicle drive train having a hybrid drive comprising an internal combustion engine, an electric motor, and an automatic transmission with a clutch arranged between the internal combustion engine and the electric motor, and one of another clutch and a torque converter located, along the drive train, between the electric motor and the automatic transmission, whereby when the drive train is powered exclusively by the electric motor, the internal combustion engine is started by engagement of the clutch arranged between the internal combustion engine and the electric motor, the method comprising the steps of:
during a downshift, engaging the clutch arranged between the internal combustion engine and the electric motor of the hybrid drive to start the internal combustion engine, and
generating a positive drive torque with the internal combustion engine before a rotational speed of the internal combustion engine equals a rotational speed of the automatic transmission input.

2. The method according to claim 1, further comprising the step of engaging the clutch arranged between the internal combustion engine and the electric motor of the hybrid drive when, as a result of the downshift, a transmission input rotational speed is increased.

3. The method according to claim 1, further comprising the step of generating the positive drive torque, with the internal combustion engine, before the rotational speed of the automatic transmission corresponds to a synchronous rotational speed of a target gear of the downshift.

4. A method of operating a motor vehicle drive train having a hybrid drive comprising an internal combustion engine, an electric motor, and an automatic transmission with a clutch arranged between the internal combustion engine and the electric motor, and one of another clutch and a torque converter located, along the drive train, between the electric motor and the automatic transmission, whereby when the drive train is powered exclusively by the electric motor, the internal combustion engine is started by engagement of the clutch arranged between the internal combustion engine and the electric motor, the method comprising the steps of:
during a downshift, engaging the clutch arranged between the internal combustion engine and the electric motor of the hybrid drive to start the internal combustion engine,
starting the internal combustion engine, during the downshift, such that the internal combustion engine generates a positive drive torque before completion of the downshift and before a rotational speed of the internal combustion engine equals a rotational speed of the automatic transmission input.

5. A method of operating a motor vehicle drive train having a hybrid drive comprising an internal combustion engine, an electric motor, and an automatic transmission with a clutch arranged between the internal combustion engine and the electric motor, and one of another clutch and a torque converter located, along the drive train, between the electric motor and the automatic transmission, whereby when the drive train is powered exclusively by the electric motor, the internal combustion engine is started by engagement of the clutch arranged between the internal combustion engine and the electric motor, the method comprising the steps of:
during a downshift, engaging the clutch arranged between the internal combustion engine and the electric motor of the hybrid drive to start the internal combustion engine,
starting the internal combustion engine during the downshift such that, while the internal combustion engine is coasting, a pressure of at least one of a shifting component of the automatic transmission, to be engaged during the downshift and a shifting component to be disengaged during the downshift, is maintained substantially constant.

6. The method according to claim 1, further comprising the step of starting the internal combustion engine, during the downshift, such that while the internal combustion engine is coasting, a pressure of the clutch located between the internal combustion engine and the electric motor is increased.

7. The method according to claim 1, further comprising the step of starting the internal combustion engine, during the downshift, such that while the internal combustion engine is coasting, a pressure of the clutch located between the internal combustion engine and the electric motor is maintained substantially constant.

8. The method according to claim 1, further comprising the step of increasing a torque of the electric motor torque, arising during the coasting of the internal combustion engine, to assist with the start of the internal combustion engine.

9. The method according to claim 4, further comprising the step of engaging the clutch, arranged between the internal combustion engine and the electric motor of the hybrid drive, when, as a result of the downshift, a transmission input rotational speed is increased.

10. The method according to claim 4, further comprising the step of starting the internal combustion engine, during the downshift, such that the internal combustion engine generates the positive drive torque before completion of the downshift.

11. The method according to claim 10, further comprising the step of generating the positive drive torque, with the internal combustion engine, before the rotational speed of the automatic transmission corresponds to a synchronous rotational speed of a target gear of the downshift.

12. The method according to claim 4, further comprising the step of starting the internal combustion engine, during the downshift, such that while the internal combustion engine is coasting, a pressure of at least one of a shifting component of the automatic transmission to be engaged, during the downshift, and a shifting component to be disengaged, during the downshift, is maintained substantially constant.

13. The method according to claim 4, further comprising the step of starting the internal combustion engine, during the downshift, such that while the internal combustion engine is coasting, a pressure of the clutch located between the internal combustion engine and the electric motor is increased.

14. The method according to claim 4, further comprising the step of starting the internal combustion engine during the downshift such that while the internal combustion engine is coasting, a pressure of the clutch located between the internal combustion engine and the electric motor is maintained substantially constant.

15. The method according to claim 4, further comprising the step of increasing a torque of the electric motor torque, arising during the coasting of the internal combustion engine, to assist with the start of the internal combustion engine.

\* \* \* \* \*